United States Patent
Närhi

(10) Patent No.: US 8,150,353 B2
(45) Date of Patent: Apr. 3, 2012

(54) MASTHEAD AMPLIFIER UNIT

(75) Inventor: Harri Närhi, Kempele (FI)

(73) Assignee: Powerwave Technologies, Inc., Santa Ana, CA (US)

( * ) Notice: Subject to any disclaimer, the term of this patent is extended or adjusted under 35 U.S.C. 154(b) by 335 days.

(21) Appl. No.: 12/434,512

(22) Filed: May 1, 2009

(65) Prior Publication Data

US 2009/0275298 A1 Nov. 5, 2009

Related U.S. Application Data

(60) Provisional application No. 61/050,127, filed on May 2, 2008.

(51) Int. Cl.
*H04B 7/02* (2006.01)
*H04B 1/10* (2006.01)
*H04B 1/50* (2006.01)

(52) U.S. Cl. ............ 455/272; 455/132; 455/101

(58) Field of Classification Search ............ None
See application file for complete search history.

(56) References Cited

U.S. PATENT DOCUMENTS

| 6,728,517 B2 * | 4/2004 | Sugar et al. ............ 455/73 |
| 7,177,662 B2 * | 2/2007 | Trachewsky et al. ...... 455/552.1 |
| 2010/0022193 A1 * | 1/2010 | Melis et al. ............ 455/73 |

* cited by examiner

*Primary Examiner* — Lincoln Donovan
*Assistant Examiner* — Terry L Englund
(74) *Attorney, Agent, or Firm* — OC Patent Law Group

(57) ABSTRACT

An amplifier unit to be placed in an antenna mast and belonging to a two-way radio system. The amplifier unit comprises two front stages for implementing diversity, each front stage comprising a receiving branch with an amplifier and a transmitting branch including a transmit bandpass filter. In both front stages the output of the receiving branch and the input of the transmitting branch are coupled together and further to a base station (BT1, BT2) by an intermediate cable. There is at least one pair of antenna radiators. One radiator of the pair is coupled to the input of the receiving branch of the first front stage and the output of the transmitting branch of the second front stage, and the other radiator to the input of the receiving branch of the second front stage and the output of the transmitting branch of the first front stage. Then, the feedback path of the signal amplified in the receiving branch circulates for the part of both front stages via both radiators and the airspace. Because of isolation between the radiators, the attenuation of the feedback path increases, in which case the transmit bandpass filters can be made smaller and cheaper.

20 Claims, 3 Drawing Sheets

MASTHEAD AMPLIFIER UNIT

RELATED APPLICATION INFORMATION

The present application claims the benefit under 35 USC 119(e) of provisional application Ser. No. 61/050,127 filed May 2, 2008, the disclosure of which is incorporated herein by reference in its entirety.

BACKGROUND OF THE INVENTION

1. Field of the Invention

The present invention relates to two-way radio communication systems of the type which use diversity, and to amplifier units placed in an antenna mast in such systems. The present invention is suitable for use especially in the base stations of cellular networks.

2. Background Information

In two-way radio communication systems, the transmitting and receiving branches of the system can have a shared antenna, but processing the signals, which propagate in opposite directions, naturally requires separate transmission paths for both. On the receiving side, the first amplifier starting from the antenna should be as close to the antenna as possible, because the receive signal is a low-level one and a long intermediate cable would attenuate it even more. Then, the signal-to-interference ratio in the input of the amplifier would be poorer compared to the amplifier being located close to the antenna. For this reason, the transmission path branches as viewed from the antenna in its vicinity to a transmitting and a receiving branch, and the latter includes a low-noise amplifier. When the antenna is close to the receiver and the transmitter, the transmission paths naturally continue separately to them. On the contrary, when the antenna is at the top of a mast relatively far away from the transmitter and the receiver, separate intermediate cables for transmitting and receiving cause a considerable additional cost for the apparatus. For this reason, transmission paths are usually joined again after the amplifier in the antenna mast so that only one intermediate cable comes down from the mast.

The term diversity refers to a means known for a long time for improving the reliability of radio communication. Types of diversity are, inter alia, frequency, polarization and spatial diversity. The term frequency diversity means that a signal containing the same information is transmitted using two carriers with different frequencies, and in receiving the signal of better quality is chosen. The term polarization diversity means that a signal containing the same information is transmitted using two carriers with the same frequency but orthogonally polarized, and in receiving the signal of better quality is chosen. Spatial diversity can be used in both transmitting and receiving. In transmission it means that a signal containing the same information is transmitted using at least two carriers with the same frequency, which are fed to antennas being located in different places, and in receiving the signals are summed. In receiving spatial diversity means that a radio signal is received by at least two antennas being located in different places, and the signals output by them are summed or the one of best quality is chosen.

FIG. 1 shows as a block diagram a typical known transmission path arrangement in a base station mast. The arrangement comprises two radiators 111, 112, front stages 120, 130 and intermediate cables 141, 142 leading down from the mast for implementing the diversity operation. The first front stage 120 comprises in parallel a receiving branch and a transmitting branch. The receiving branch comprises in the propagation direction of the signal a first receive filter 121, a low-noise amplifier 122 and a second receive filter 123. The receive filters are of band-pass type and they strongly attenuate frequency components outside the receive band. The transmitting branch only comprises a transmit filter 125 of band-pass type which strongly attenuates frequency components outside the transmit band. The input of the first receive filter 121 and the output of the transmit filter 125 are coupled by a shared line to the first radiator 111 of the antenna structure ANT. In this description the term "radiator" means an antenna element which may be for both transmitting and receiving. The output of the second receive filter 123 and the input of the transmit filter 125 are coupled to the shared first intermediate cable 141, which is connected at its lower end to a first base station segment BT1. The second front stage 130 is identical with the first front stage 120. Thus it comprises a receiving branch with a low-noise amplifier 132 between the receive filters 131 and 133 and a transmit filter 135 parallel to the receiving branch. The second front stage is coupled by a shared line to the second radiator 112 of the antenna structure ANT and from its end on the side of the base station to the shared second intermediate cable 142. This is connected at its lower end to a second base station segment BT2. The first 120 and the second 130 front stage together constitute an amplifier unit 100.

In FIG. 1 are further marked a transmit signal TX propagating via the transmit filter 125 to the first radiator 111 and a receive signal RX propagating from the first radiator to the amplifier 122.

FIG. 2 shows a disadvantage of the structure according to FIG. 1. The drawing presents one front stage according to FIG. 1. Similarly, it will be readily appreciated that the front stage has a first receive filter 221, a low-noise amplifier 222, and a second receive filter 223. Coupling the output of the second receive filter 223 to the input of the transmit filter 225 and coupling the output of the transmit filter to the input of the first receive filter in accordance with the above description produces a closed loop. This means that a certain part of the signal fed by the low-noise amplifier, 222 (LNA) circulates back to the input of the amplifier. In FIG. 2, the route of such a feedback signal, i.e. leak signal LK, has been drawn with a grey line. If the level of the leak signal becomes high enough, the loop starts to oscillate, in which case the front stage would be useless. However, also less fatal deterioration in operation can occur. For example, if the level of the leak signal is, e.g. 50 dB, lower than the level of the output signal of the LNA and the gain of the LNA is 30 dB, an "extra" gain ripple of almost one decibel occurs in the transmission curve of the receiving branch in its pass band, which ripple is far too high for desired operation. In order for such a gain ripple not to occur, the attenuation of the feedback path deducted by the amplification of the LNA should be 30-35 dB depending on the gain of the LNA. The required attenuation takes place in the transmit filter 225. This filter is designed so that it attenuates especially signals in the receive band. If the gain of the LNA is e.g. 32 dB, consistent with the above, a 67 dB attenuation is required of the transmit filter in the receive band. Such a high attenuation relatively close to the transmit band requires, for its part, a multi-resonator structure. Pass attenuation of the transmit filter i.e. its attenuation in the transmit band is naturally higher the more resonators there are in the filter in series. The pass attenuation is a critical parameter because all attenuation between the power amplifier of the transmitter and the antenna causes a decrease in the efficiency and heating of the power amplifier. In order for the pass attenuation of a multi-resonator transmit filter to remain, e.g., less than 0.5 dB, relatively large-sized resonators are required, i.e. a massive and thus expensive transmit filter is required. Ultimately, this disadvantage is caused by the loop in the front stage.

SUMMARY OF THE INVENTION

In a first aspect the present invention provides an amplifier unit adapted for coupling to a radiator pair in a radio communication system with separate transmit and receive bands. The amplifier unit comprises a first front stage and a second front stage for implementing diversity. Both the first and second front stages comprise a receiving branch with an amplifier and at least the second front stage comprises a transmitting branch with a transmit bandpass filter. The input of the transmitting branch and the output of the receiving branch of the second front stage are coupled together by an intermediate cable. The input of the receiving branch of the first front stage and the output of the transmitting branch of the second front stage are coupled together to be further connected to a first radiator of the radiator pair. The input of the receiving branch of the second front stage is arranged to be connected to at least a second radiator of the radiator pair.

In a preferred embodiment the amplifier unit further comprises a transmitting branch with a transmit bandpass filter in the first front stage, wherein the input of the receiving branch of the second front stage and the output of the transmitting branch of the first front stage are coupled together to be further connected to the second radiator of the radiator pair. Preferably the minimum value of attenuation of the transmit filter in the receive band is about 25 dB+1.25·G–I, in which G is the gain of the amplifier and I is the isolation between the radiators of the radiator pair. The receiving branch of both front stages preferably further comprises a receive bandpass filter at least between the antenna and the amplifier.

In another aspect the present invention provides a diversity radio communication system. The system comprises a first antenna radiator, a second antenna radiator, a first feed cable, and a second feed cable. The system further comprises a first transmit path coupling the first antenna radiator and the first feed cable, a first receive path, including a first amplifier and a first receive bandpass filter, coupling the first antenna radiator and the second feed cable, and a second receive path, including a second amplifier and a second receive bandpass filter, coupling the second antenna radiator and the first feed cable.

In a preferred embodiment of the diversity radio communication system the first antenna radiator and second antenna radiator are spaced apart providing spatial diversity. Alternatively, the first antenna radiator and second antenna radiator have different polarizations providing polarization diversity. The first and second receive bandpass filters may have different passbands providing frequency diversity. The diversity radio communication system may further comprise a second transmit path coupled to the second antenna radiator and the second feed cable. The first transmit path preferably comprises a first transmit bandpass filter and the second transmit path preferably comprises a second transmit bandpass filter. The first receive bandpass filter is preferably configured between the first antenna radiator and an input of the first amplifier and the first receive path may further comprise a third receive bandpass filter coupled in series with an output of the first amplifier and the second feed cable. The second receive bandpass filter is preferably configured between the second antenna radiator and an input of the second amplifier and the second receive path may further comprise a fourth receive bandpass filter coupled in series with an output of the second amplifier and the first feed cable.

In another aspect the present invention provides an amplifier unit adapted for use in a masthead having first and second radiators. The amplifier unit comprises a first front stage having a first receiving branch including a first amplifier, a second front stage having a second receiving branch including a second amplifier, and at least one transmit branch configured in the first or second front stage. The amplifier unit further comprises means for coupling the first and second front stages and radiators to circulate a feedback path of a signal amplified in the receiving branch of at least one of the front stages via both the radiators and an airspace to increase the attenuation of a leak signal between receive and transmit branches.

In a preferred embodiment the amplifier unit further comprises first and second cables connecting to the means for coupling and to first and second base station connections. The first receiving branch preferably further comprises a first receive bandpass filter and the second receiving branch preferably further comprises a second receive bandpass filter. The transmit branch preferably further comprises a first transmit bandpass filter. The amplifier unit may further comprise a second transmit branch. The means for coupling the first and second front stages and radiators then preferably circulates first and second feedback paths of signals amplified in the receiving branches of both the first and second front stages, respectively, via both the radiators and an airspace.

Further features and advantages of the invention will be appreciated from the following detailed description of the invention.

DETAILED DESCRIPTION OF THE INVENTION

An object of the invention is to minimize the above described disadvantages related to the prior art. One aspect of the invention is the following. An amplifier unit is located in an antenna mast, which unit has two front stages for implementing diversity operation. Both front stages preferably have a receiving branch including an amplifier and a transmitting branch including a transmit filter. In both front stages, the output of the receiving branch and the input of the transmitting branch are coupled together and further by an intermediate cable to the radio equipment being located down the mast. At least one pair of antenna radiators is provided. One radiator of the pair is coupled to the input of the receiving branch of the first front stage and the output of the transmitting branch of the second front stage, and the other radiator to the input of the receiving branch of the second front stage and the output of the transmitting branch of the first front stage.

Then, the feedback path of a signal amplified in the receiving branch circulates, for the part of both front stages, via both radiators and the airspace.

An advantage of the invention is that the transmit filters of the amplifier unit can be made smaller and cheaper compared to prior art approaches. This is because the isolation between the radiators is directly summed to the other attenuation of the feedback path of the amplified receive signal. Then, the attenuation of the transmit filter can be decreased by the corresponding amount without the feedback starting to degrade the receive signal being fed to the base station.

The invention will now be described in detail in relation to preferred embodiments. The description refers to the accompanying drawings.

Figure 1:
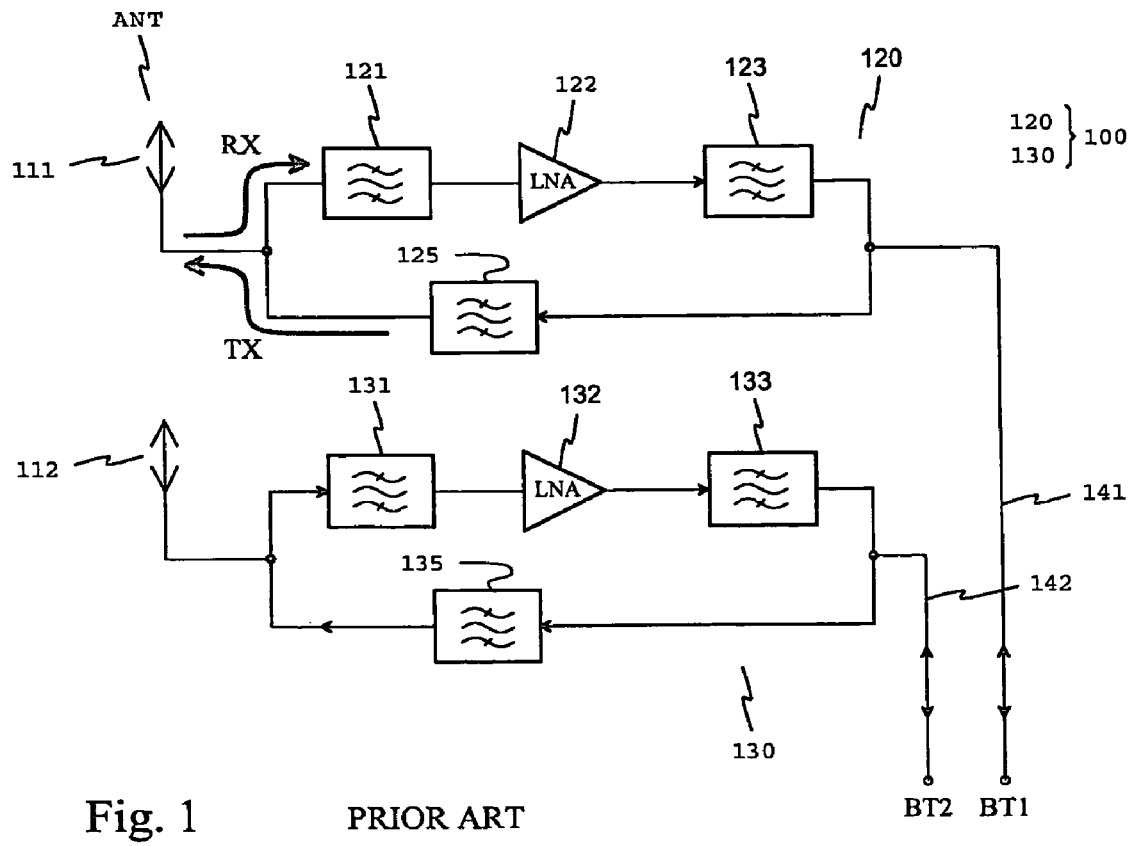
FIG. 1 shows as a block diagram of an example of a prior art amplifier unit and the transmission path arrangement in an antenna mast.
Figure 3:
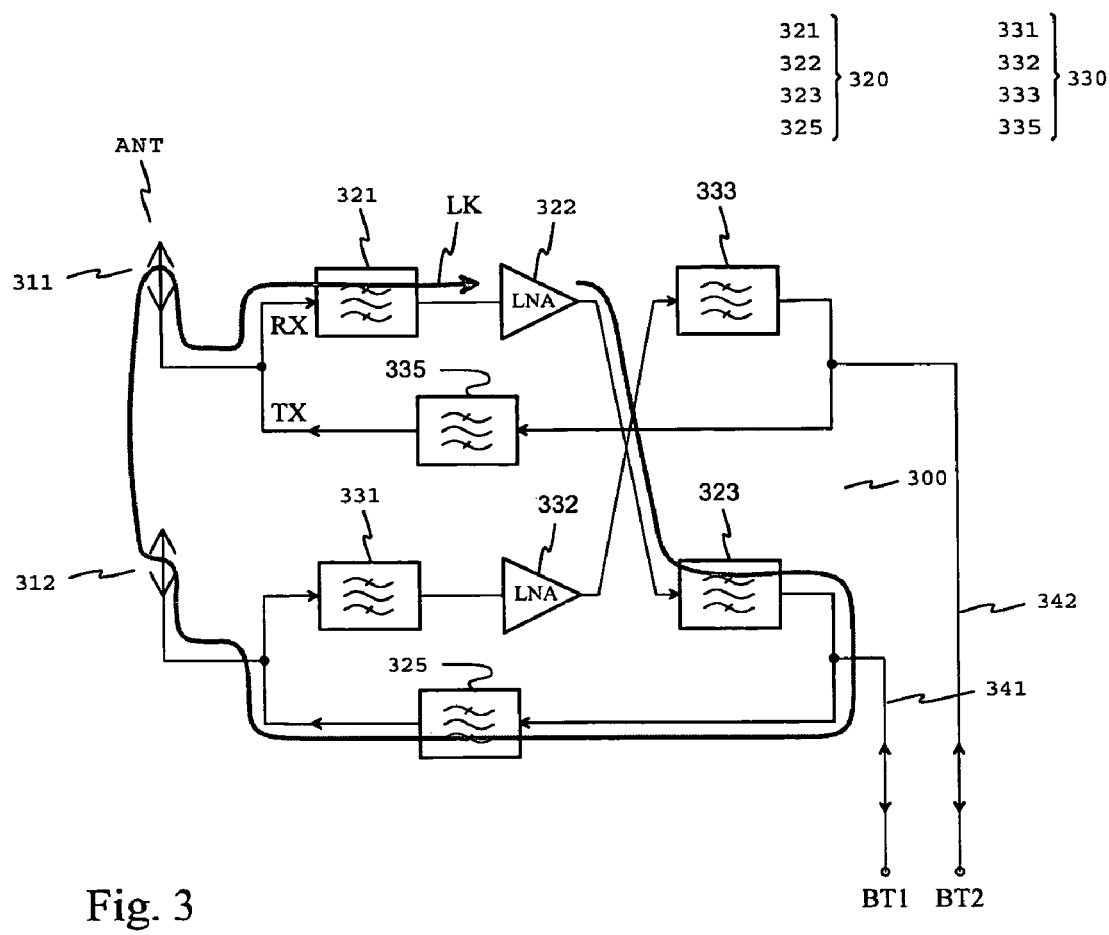
FIG. 3 shows a block diagram of an embodiment of the amplifier unit and the transmission path arrangement in an antenna mast according to the present invention.

Referring to FIG. 3 an example of the amplifier unit and the transmission path arrangement in an antenna mast, according to the invention, is illustrated. The amplifier unit 300 includes some similar functional blocks as the amplifier unit 100 in FIG. 1 which need not be described in detail. There are two redundant radiators, front stages and intermediate cables leading down from the mast for implementing diversity. Also the front stages include a receiving branch with a first receive filter, an LNA and a second receive filter and a transmitting branch with a transmit filter which may be implemented as known to those skilled in the art. Similarly, the output of the receiving branch and the input of the transmitting branch in the first front stage 320 are coupled together and further connected by an intermediate cable 341 to a first segment BT1 of a radio equipment, such as a base station, and the output of the receiving branch and the input of the transmitting branch in the second front stage 330 are coupled together and further connected by a second intermediate cable 342 to a second segment BT2 of the radio equipment. In the case of frequency diversity the bandpass filters in the two stages will have different passbands. A difference to FIG. 1 is that the input of the receiving branch of the first front stage 320 has now been coupled to the output of the transmitting branch of the second front stage 330 and not to the output of the transmitting branch of the first front stage, and correspondingly the input of the receiving branch of the second front stage 330 has now been coupled to the output of the transmitting branch of the first front stage 320 instead of the second front stage. The former coupling circuit is connected by a shared line to the first radiator 311 of the radiator pair and the latter coupling circuit to the second radiator 312 of the radiator pair of the antenna structure ANT.

Figure 2:
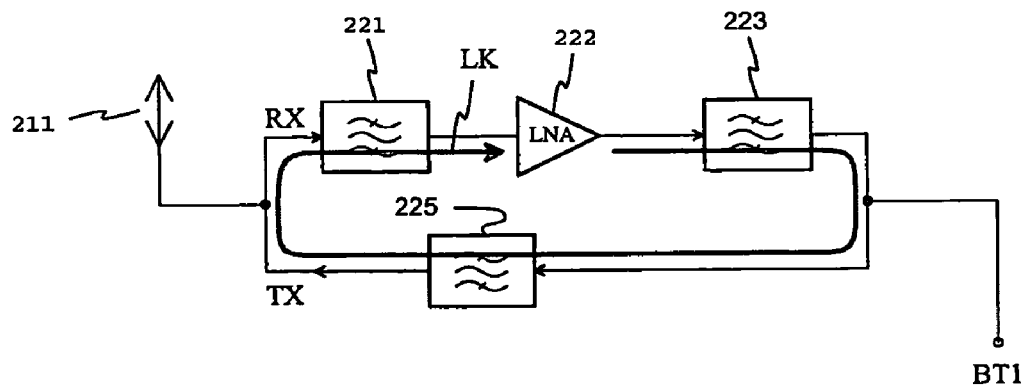
FIG. 2 shows a block diagram of the system of FIG. 1 showing a disadvantage of known amplifier units.

From the above-described arrangement it follows that the feedback path of both LNAs is longer than in known structures. For example, when starting from the first LNA 322, the feedback path consists of the route of the second receive bandpass filter 323 of the first front stage, the transmit bandpass filter 325 of the first front stage, the second radiator 312, the air space, the first radiator 311, the first bandpass receive filter 321 of the first front stage, the first LNA 322. Via this route, the leak signal LK reaches the input of the first LNA. There is a similar feedback path from the output of the second LNA 332 to its input, having the opposite direction in the airspace. Compared to the amplifier unit in FIG. 1, the feedback path is added by a loop via the radiator pair and the wireless radio path between them. For this reason, the isolation between the radiators is added to the attenuation caused by the feedback path. In the exemplary case mentioned in the description of FIG. 2, a 67 dB attenuation is required of the transmit filter in the receive band in order for the feedback to not cause a significant gain ripple in the receiving branch. If the isolation between the radiators has, e.g., a typical value of 30 dB, by changing the structure of the amplifier unit to the one according to FIG. 3, 67−30=37 dB is adequate for the attenuation of the transmit filter. The attenuation of the transmit filter can be lower the lower the gain of the LNA is. Somewhat more generally, it can be said that $25\,dB+1.25\cdot G-I$ is enough for the attenuation of the transmit filter, G being the gain of the LNA and I the isolation between the radiators of the radiator pair.

The lower stop attenuation means that the order of the transmit filter can be decreased, in which case it can be made considerably smaller without its pass attenuation increasing. For example, a five-resonator transmit filter can be replaced with a four- or three-resonator filter. Naturally, the filter becomes also more reliable and considerably cheaper.

Figures 4A, 4B, 4C:
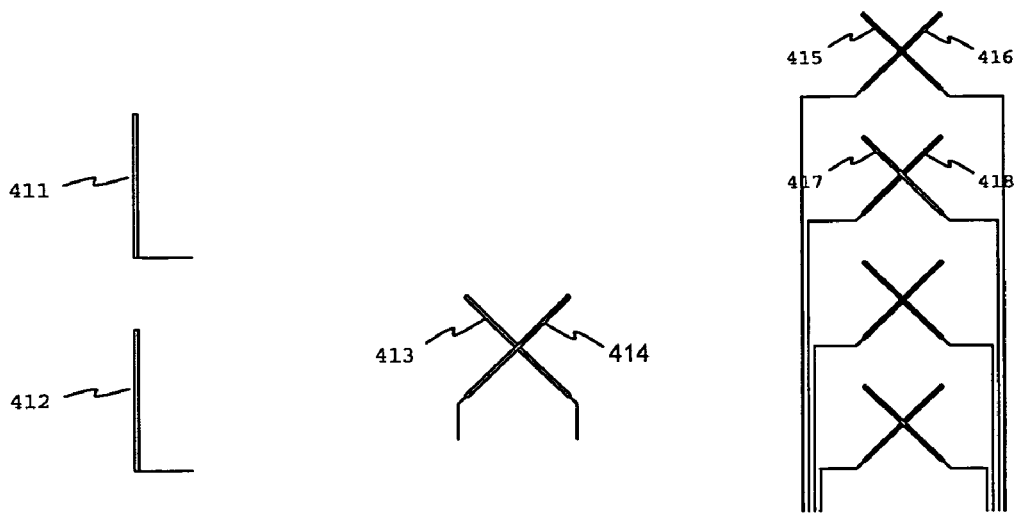
FIGS. 4a-c show examples of an antenna structure to be connected to an amplifier unit according to the present invention.

FIGS. 4a-c show examples of an antenna structure to be connected to an amplifier unit according to the invention. The structures are shown without the ground plane of the antenna and their radiators as simple graphic symbols. In FIG. 4a there is an antenna structure corresponding to FIGS. 2 and 3, in which the first 411 and the second 412 radiator are in the same position and at a certain distance from each other. The spatial diversity can be implemented this way. In FIG. 4b there is an antenna structure in which the first 413 and the second 414 radiator are in a 90-degree angle in respect of each other and on top of each other as viewed in the direction of the normal of the plane defined by them. The polarization diversity can be implemented this way. In FIG. 4c there is an array antenna with four radiator pairs according to FIG. 4b in a vertical row, a pair constituted by radiators 417, 418, a pair formed by radiators 415, 416 and two other identical pairs. By changing the phases of the carriers being taken to different pairs to different amounts, the tilt angle of the main beam of the antenna can be changed. In this case, each radiator pair requires its own amplifier unit.

Figure 5:
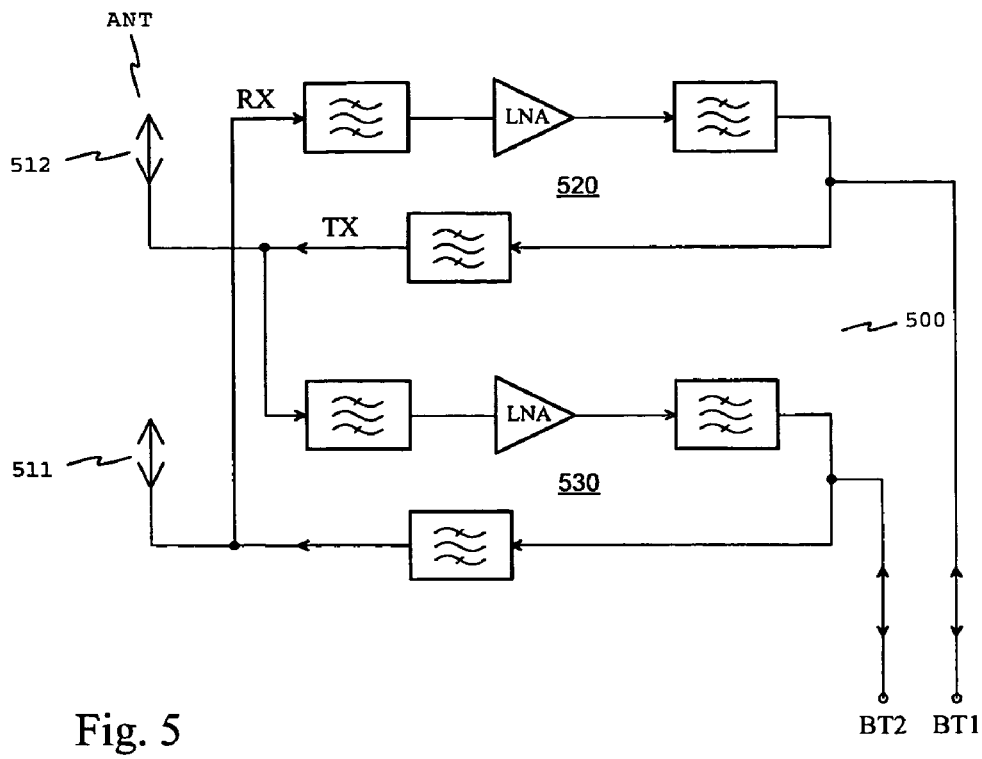
FIG. 5 shows the structure according to FIG. 3 drawn in a different way.

FIG. 5 shows the same structure according to the invention as FIG. 3 only drawn differently. The first front stage 520 and the second front stage 530 of the amplifier unit 500 are thus coupled in the same way as the front stages in FIG. 3.

Figure 6:
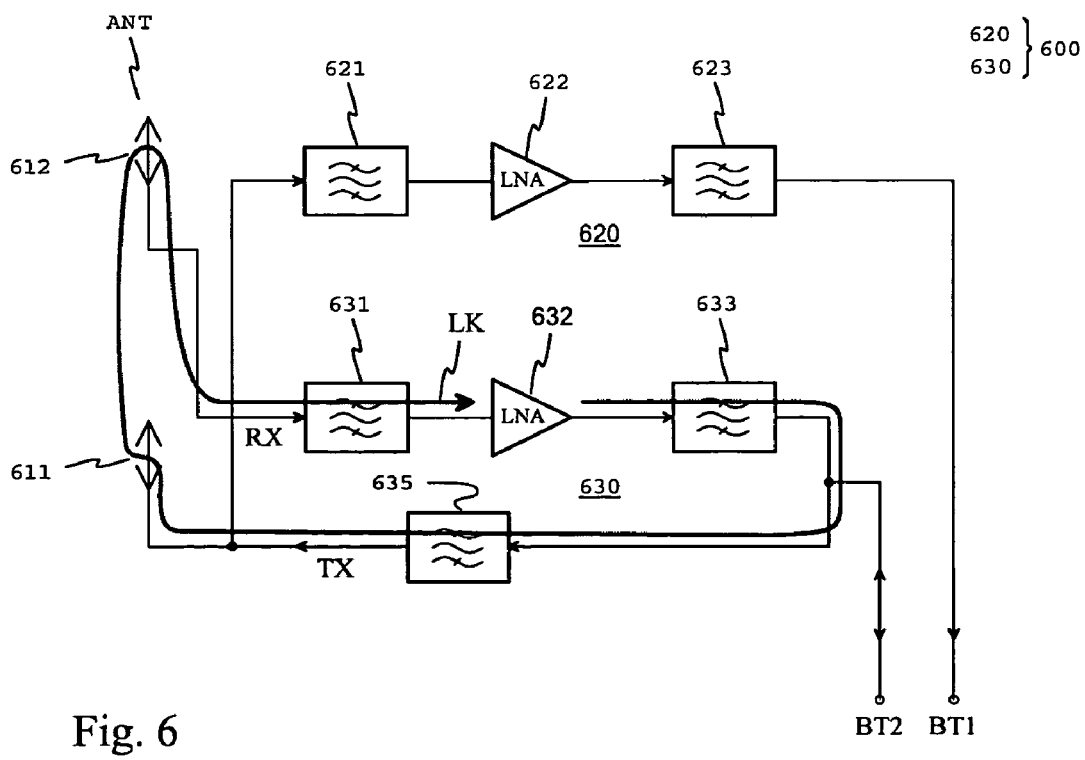
FIG. 6 shows another embodiment of the amplifier unit according to the present invention.

FIG. 6 shows another example of the amplifier unit according to the invention. The amplifier unit 600 is similar to the one described in FIGS. 3 and 5 with the difference that the first front stage 620 comprises only the receiving branch. For this reason, no feedback problem can occur in that stage. The input of the first front stage 620 is coupled to the output of the transmitting branch of the second front stage 630 and further to the first radiator 611 of the radiator pair of the antenna structure ANT, as in FIGS. 3 and 5. The input of the receiving branch of the second front stage 630 is now coupled only to the second radiator 612 of the radiator pair. In this case, when starting from the second LNA 632, the feedback path is formed along the route the second bandpass receive filter 633 of the second front stage, the transmit bandpass filter 635 of the second front stage, the first radiator 611, the air space, the second radiator 612, the first bandpass receive filter 631 of the second front stage, and the second LNA 632. The feedback path thus circulates via both radiators according to the invention.

Above was described a masthead amplifier unit according to a preferred embodiment of the invention. There can naturally be many variations in details. For example, the filter arrangement of the receiving branch of the front stages may be varied. The invention can be applied, and implemented in many other different ways as will be appreciated by those skilled in the art. Accordingly, the illustrated preferred embodiments should not be viewed as limiting in nature.

What is claimed is:

1. An amplifier unit, adapted for coupling to a radiator pair in a radio communication system with separate transmit and receive bands, comprising;

a first front stage and a second front stage for implementing diversity, wherein both said first and second front stages comprise a receiving branch with an amplifier and at least the second front stage comprises a transmitting branch with a transmit bandpass filter, wherein an input of said transmitting branch of the second front stage and an output of the receiving branch of the second front stage are coupled together by an intermediate cable, wherein the input of the receiving branch of the first front stage and an output of the transmitting branch of the second front stage are coupled together to be further connected to a first radiator of said radiator pair and an input of the receiving branch of the second front stage is arranged to be connected to at least a second radiator of said radiator pair.

2. An amplifier unit as set out in claim 1, further comprising a transmitting branch with a transmit bandpass filter in the first front stage, wherein the input of the receiving branch of the second front stage and an output of the transmitting branch of the first front stage are coupled together to be further connected to the second radiator of said radiator pair.

3. An amplifier unit as set out in claim 1, wherein a minimum value of attenuation of said transmit bandpass filter of one of said first or second front stages in the receive band is about 25 dB +1.25.G −I, in which G is the gain of the amplifier of said one of said first or second front stages and I is the isolation between the radiators of the radiator pair.

4. An amplifier unit as set out in claim 1, wherein the receiving branch of both front stages each further comprises a receive bandpass filter at least between the corresponding radiator and the amplifier of each of both front stages.

5. A diversity radio communication system, comprising:
a first antenna radiator;
a second antenna radiator;
a first feed cable;
a second feed cable;
a first transmit path coupling the first antenna radiator and the first feed cable;
a first receive path, including a first amplifier and a first receive bandpass filter, coupling the first antenna radiator and the second feed cable; and
a second receive path, including a second amplifier and a second receive bandpass filter, coupling the second antenna radiator and the first feed cable.

6. A diversity radio communication system as set out in claim 5, wherein said first antenna radiator and second antenna radiator are spaced apart providing spatial diversity.

7. A diversity radio communication system as set out in claim 5, wherein said first antenna radiator and second antenna radiator have different polarizations providing polarization diversity.

8. A diversity radio communication system as set out in claim 5, wherein said first and second receive bandpass filters have different passbands providing frequency diversity.

9. A diversity radio communication system as set out in claim 5, further comprising a second transmit path coupled to the second antenna radiator and the second feed cable.

10. A diversity radio communication system as set out in claim 9, wherein said first transmit path comprises a first transmit bandpass filter.

11. A diversity radio communication system as set out in claim 10, wherein said second transmit path comprises a second transmit bandpass filter.

12. A diversity radio communication system as set out in claim 5, wherein said first receive bandpass filter is configured between the first antenna radiator and an input of said first amplifier and wherein said first receive path further comprises a third receive bandpass filter coupled in series with an output of said first amplifier and the second feed cable.

13. A diversity radio communication system as set out in claim 12, wherein said second receive bandpass filter is configured between the second antenna radiator and an input of said second amplifier and wherein said second receive path further comprises a fourth receive bandpass filter coupled in series with an output of said second amplifier and the first feed cable.

14. An amplifier unit adapted for use in a masthead having first and second radiators, comprising:
a first -front stage having a first receiving branch including a first amplifier;
a second front stage having a second receiving branch including a second amplifier, wherein at least the second front stage comprises a transmit branch; and
means for coupling the first and second front stages, and the radiators, to circulate a feedback path of a signal amplified in the receiving branch of at least one of the front stages via both the radiators and an airspace to increase the attenuation of a leak signal between receiving and transmit branches of said at least one of the front stages.

15. An amplifier unit as set out in claim 14, further comprising:
first cables connecting to said means for coupling and to first base station connections; and,
second cables connecting to said means for coupling and to second base station connections.

16. An amplifier unit as set out in claim 14, wherein said first receiving branch further comprises a first receive bandpass filter.

17. An amplifier unit as set out in claim 16, wherein said second receiving branch further comprises a second receive bandpass filter.

18. An amplifier unit as set out in claim 14, wherein the transmit branch comprises a first transmit bandpass filter.

19. An amplifier unit as set out in claim 14, further comprising a second transmit branch.

20. An amplifier unit as set out in claim 19, wherein said means for coupling the first and second front stages, and the radiators, circulates first and second feedback paths of signals amplified in the receiving branches of both the first and second front stages, respectively, via both the radiators and an airspace.

* * * * *